Dec. 15, 1964  H. L. SMITH, JR  3,160,896
PRESSURIZED CHAMBER DYEING WITH PERSONNEL INGRESS
INTO AND EGRESS FROM THE CHAMBER
Filed July 28, 1959  7 Sheets-Sheet 1

INVENTOR
HORACE L. SMITH, JR.

BY Fisher, Christen & Goodson

ATTORNEY

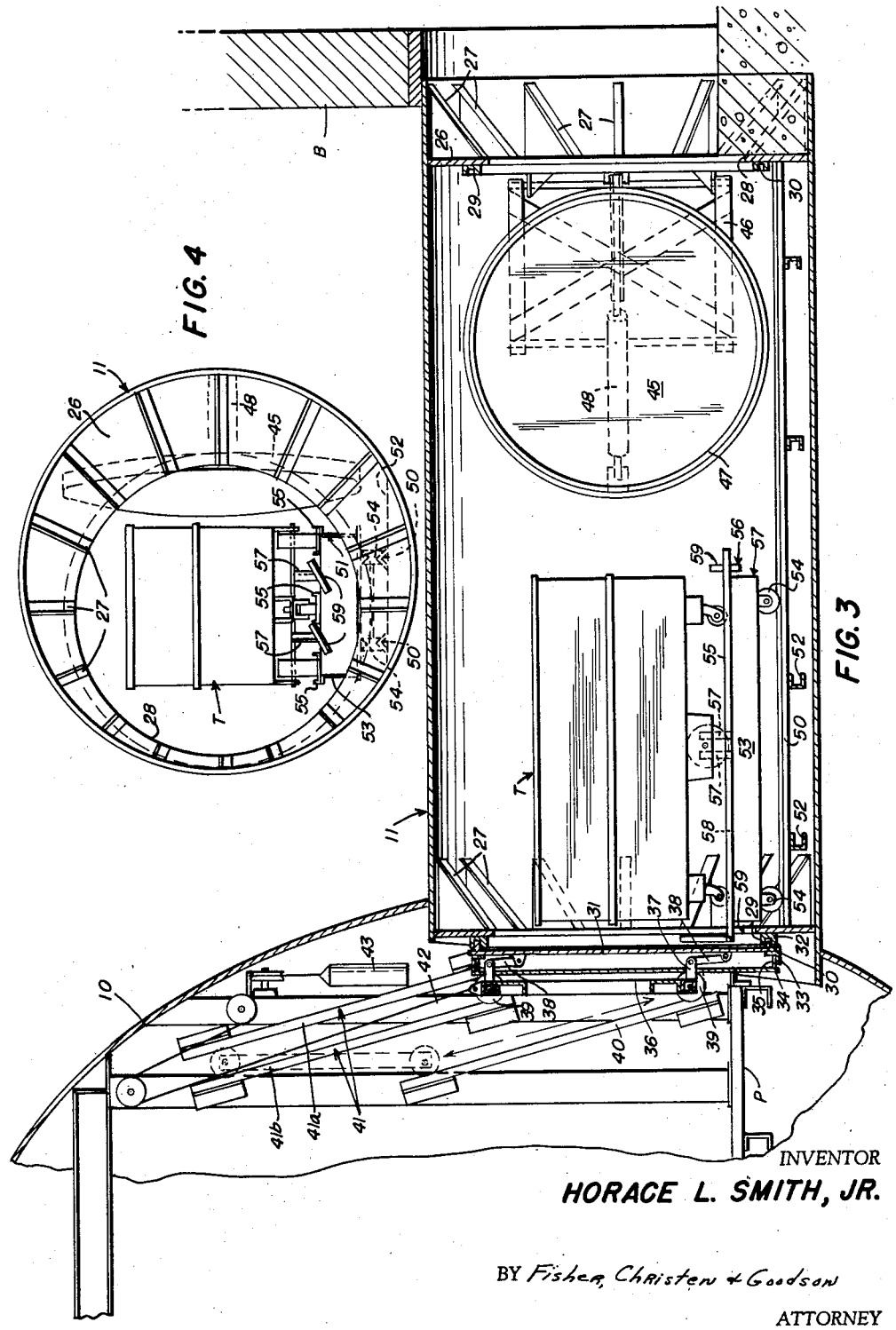

Dec. 15, 1964 H. L. SMITH, JR 3,160,896
PRESSURIZED CHAMBER DYEING WITH PERSONNEL INGRESS
INTO AND EGRESS FROM THE CHAMBER
Filed July 28, 1959 7 Sheets-Sheet 3
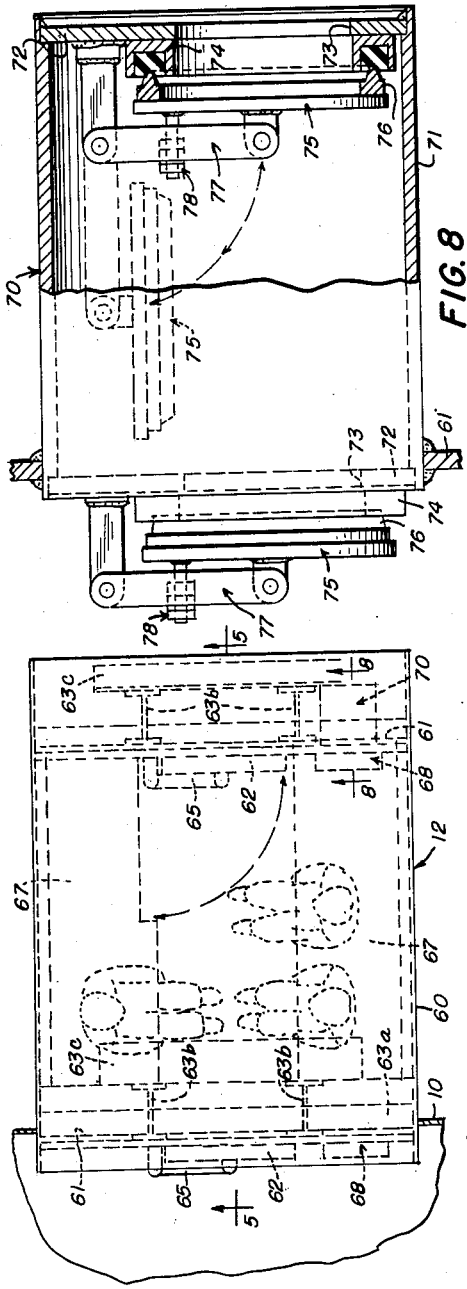
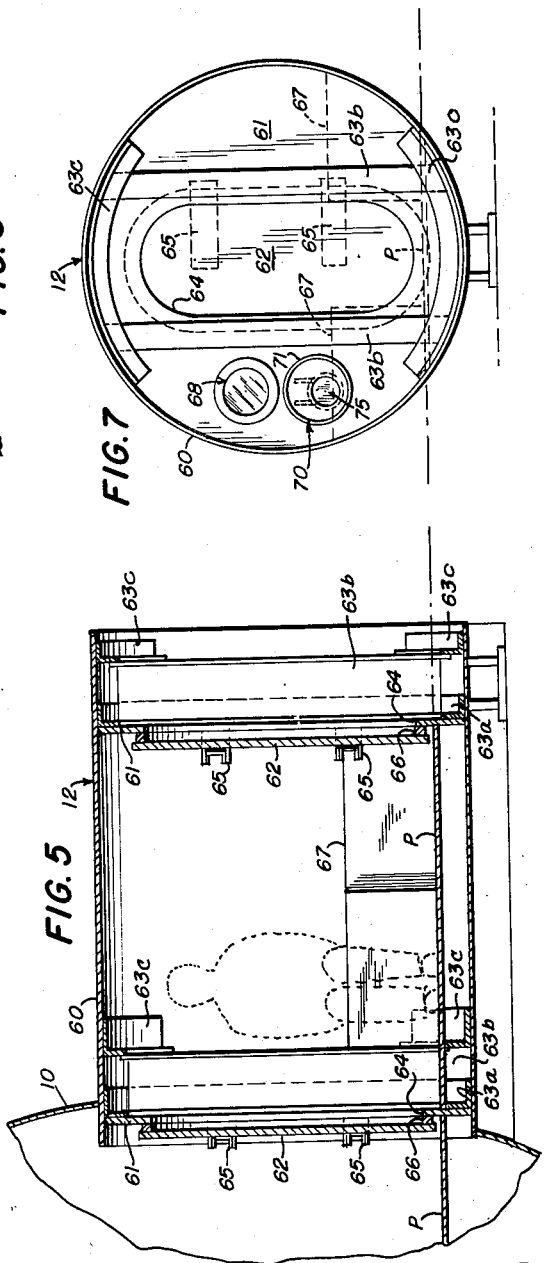
INVENTOR
HORACE L. SMITH, JR.
BY Fisher, Christen + Goodson
ATTORNEY

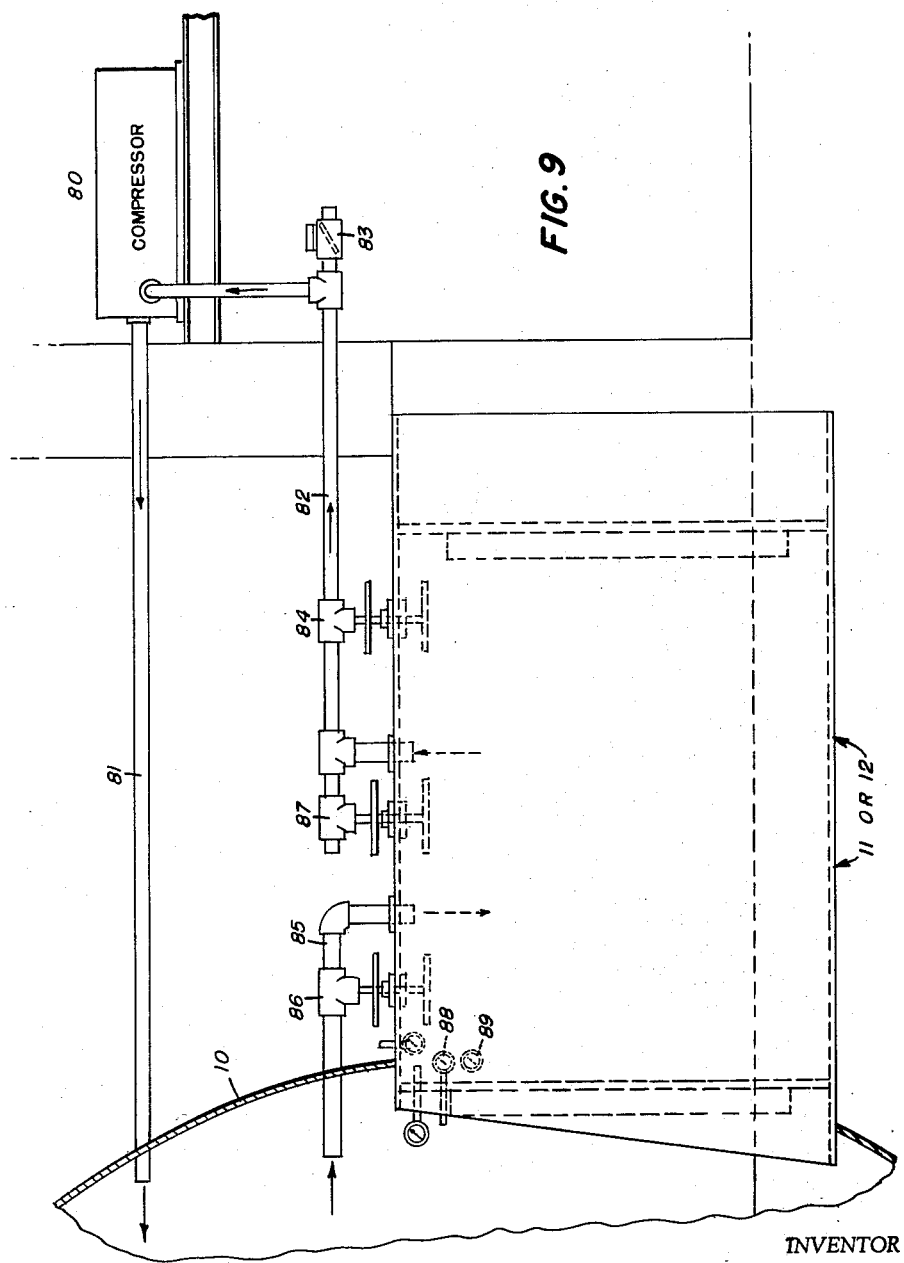

Dec. 15, 1964         H. L. SMITH, JR         3,160,896
PRESSURIZED CHAMBER DYEING WITH PERSONNEL INGRESS
INTO AND EGRESS FROM THE CHAMBER
Filed July 28, 1959         7 Sheets-Sheet 5
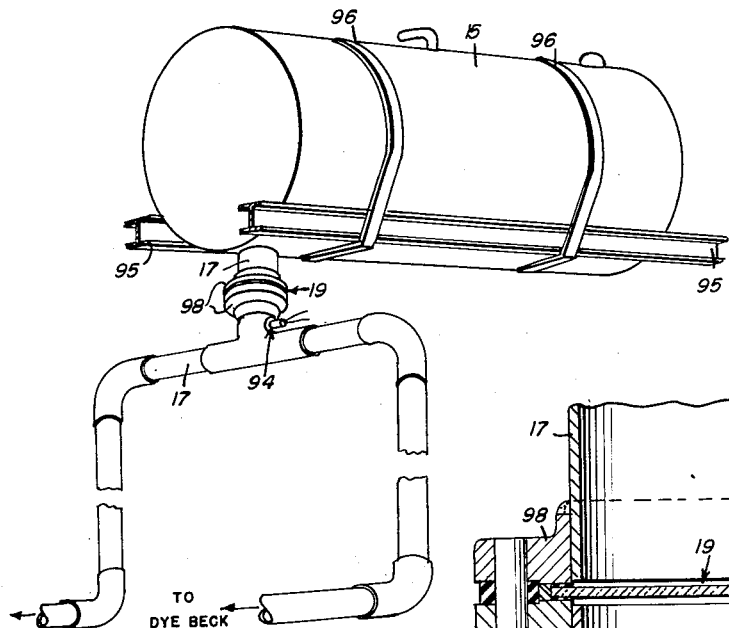
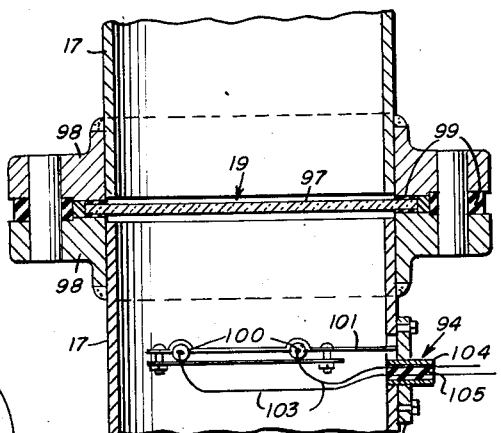
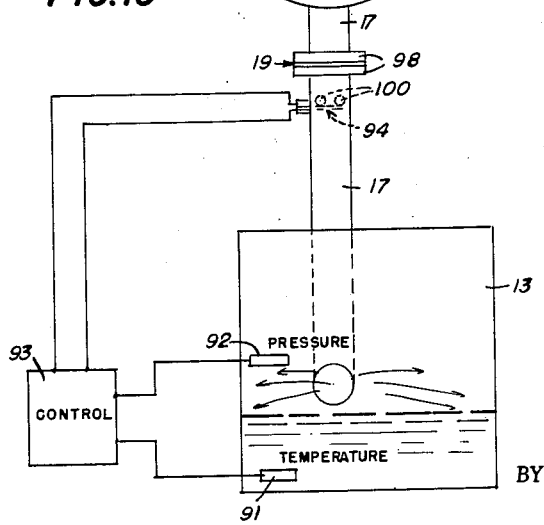
INVENTOR
HORACE L. SMITH, JR.
BY *Fisher, Christen + Goodson*
ATTORNEY

3,160,896
PRESSURIZED CHAMBER DYEING WITH PERSONNEL INGRESS INTO AND EGRESS FROM THE CHAMBER
Horace L. Smith, Jr., Richmond, Va., assignor, by mesne assignments, to Hupp Corporation, a corporation of Virginia
Filed July 28, 1959, Ser. No. 830,100
4 Claims. (Cl. 8—147)

This invention is directed to systems, apparatus and methods for the fluid treatment of textiles under pressure.

The dyeing of textiles under pressure permits the use of temperatures higher than normally employed and generally improves dyeing efficiency especially in heavy shades. Synthetic fibers, such as, Dacron, Orlon and nylon, are at best inefficiently dyed and usually cannot be dyed by conventional procedures. The efficiency of dyeing synthetic fibers is improved also by special techniques employing carriers or special solvents in the dyebath. The carriers and special solvents thus employed are expensive in the quantities required and many times are hazardous to handle. In addition, special techniques in the use of such carriers and solvents are required necessitating the development and use of new skills and dyeing schedules.

Dyeing textiles under pressure has been heretofore conducted in package and beam dyeing machines, closed kiers, autoclaves, enclosed jigs, and other specially constructed dyeing apparatus having pressure-tight enclosures covering the dyebath. Equipment of this type requires pressurization prior to dyeing and de-pressurization after dyeing. The cyclical pressurizations and de-pressurizations add to the operating costs of dyeing, since compressed gases released during de-pressurization represent energy lost to the atmosphere. The dyeing equipment and operators are not productive during periods of pressurization and de-pressurization, thus, adding to expenses of the dyeing operation.

The pressurized dyeing zones of pressure-dyeing apparatus heretofore employed also are not readily accessible without de-pressurization for tending the dyebath and/or textile being dyed. De-pressurization is a lengthy operation and requires cooling, or removal of the dyebath, prior to reduction of pressure and subsequent reheating to dyeing temperatures when dyeing is to be resumed. Interruption of the dyeing operation by de-pressurization is costly, lengthens the dyeing operation and, sometimes, for example, in cross-dyeing, results in faultily dyed textiles.

Another disadvantage of heretofore known pressure-dyeing apparatus is the hazard of escaping pressurized hot liquids and/or gases upon the accidental rupturing, or opening, of the pressure-tight enclosures. This hazard is especially severe when the dyebath is heated to a temperature above its atmospheric boiling point such that a part or all of the dyebath spontaneously vaporizes when the pressure is suddenly reduced.

In accordance with this invention, a textile treating system, apparatus and method are provided which permit the use of high temperatures, above in the boiling points of fluids employed in the treatment, and in which conventional equipment can be employed without extensive modification. Further, a system, apparatus and method of dyeing textiles is provided which is safer, more efficient and less expensive in operation than systems, apparatus and methods heretofore known.

One object of this invention is to provide a system, apparatus and method for the more economical and efficient treatment of textiles under pressure.

Another object is to provide a system, apparatus and method of dyeing textiles under pressure which obviate the necessity for a successive pressurization and de-pressurization before and after each dyeing operation.

Another object is to provide a system, apparatus and method of dyeing textiles under pressure wherein the dyebath and the textile being dyed can be readily tended during the dyeing operation.

Another object is to provide a system, apparatus and method of dyeing textiles under pressure which avoid the hazards of escaping pressurized liquids and/or gases.

Still another object is to provide a system, apparatus and method of dyeing under pressure which substantially eliminate the hazards attending the spontaneous vaporization of part or all of a heated dyebath, and/or the violent ejection of the heated dyebath, upon sudden reduction of pressure acting on the dyebath.

A further object is to provide a system, apparatus and method of dyeing synthetic fibers under pressure and at elevated temperatures wherein said fibers can be dyed to a deep shade.

Various other objects, advantages and features of the invention are apparent from the following detailed description and the accompanying drawings illustrating a preferred embodiment thereof.

In the drawings:

FIG. 3 is an enlarged, partial sectional elevation on line 3—3 in FIG. 1 showing the interior of the materiel air lock, the major portion of the pressure chamber and auxiliary building being broken away to simplify the illustration;

FIG. 4 is an end view of the materiel lock;

FIG. 5 is an enlarged partial sectional view on line 5—5 in FIG. 1 showing the interior of the personnel air locks, the major portion of the pressure chamber being broken away to simplify the illustration and a portion of the auxiliary building being shown;

FIG. 6 is a plan view of the personnel air lock shown in FIG. 5;

FIG. 7 is an end view of the personnel air lock viewed from the auxiliary building;

FIG. 8 is an enlarged elevation on line 8—8 in FIG. 6 showing the sample air lock with its casing partly cut away;

FIG. 9 is a diagrammatic elevation illustrating a flow system for supplying compressed air to the chamber and for controlling pressure in the air locks;

FIG. 10 is a diagrammatic view illustrating safety apparatus for suddenly cooling the dyebath;

FIG. 11 is a perspective view showing the cooling fluid reservoir, associated conduits and frangible and rupturing means of said safety apparatus;

FIG. 12 is a sectional view of said conduits showing the frangible and rupturing means mounted therein;

FIG. 13 is a diagrammatic view of the control mechanism which actuates the rupturing means upon hazardous drops in chamber pressure;

The dyeing system and apparatus of this invention include a chamber adapted to be pressurized, means for pressurizing the chamber, a container adapted to hold a dyebath inside the chamber and allow pressures within the chamber to act on the dyebath, means for heating the dyebath to a temperature above its atmospheric boiling point, and means for maintaining the air within the chamber in condition for human breathing. There is no critical maximum size of the chamber. However, it is at least large enough to accommodate the necessary dyeing equipment and operators for tending the equipment, material being dyed and the dyebath.

Auxiliary apparatus which are advantageously employed in conjunction with the system include air locks for admitting personnel and materiel into the pressurized chamber without the need for de-pressurizing, safety apparatus for suddenly cooling the dyebath when a sudden drop in chamber pressure lowers the dyebath boiling point to about the dyebath temperature or below, and conduits extending into and out of the chamber, respectively, for supplying fluids for the dyebath and for draining said dyebath. The safety apparatus broadly comprises a reservoir of cooling fluid connected by conduit to the dyebath, a blocking member in the conduit between the reservoir and dyebath preventing the flow of cooling fluid through the conduit into the dyebath, an actuating device operable to release the blocking member and a control mechanism responsive to a predetermined relationship of chamber pressure to dyebath temperature for activating the actuating device whenever the relationship is met or exceeded.

Figure 1:
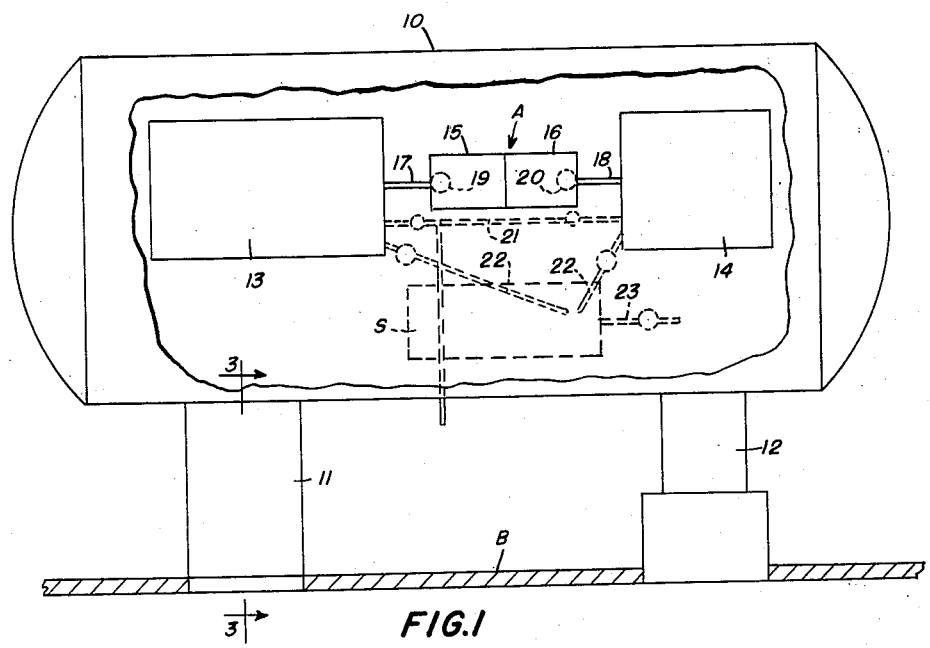
FIGS. 1 and 2 are, respectively, a diagrammatic plan view and a diagrammatic elevation of the textile treating system with portions of the pressure chamber cut away to show its interior, FIG. 1 showing a portion of the auxiliary building to which the pressure chamber is connected via air locks.
Figure 2:
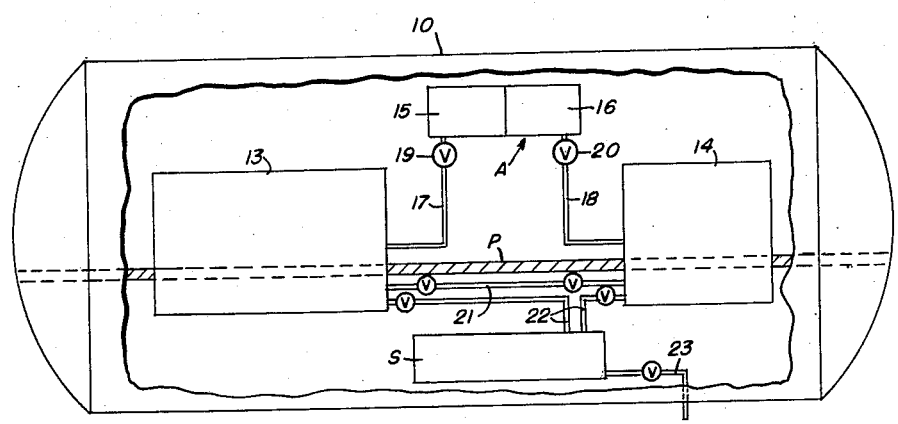

Referring to FIGS. 1 and 2, the system there shown comprises a pressure chamber 10, air locks 11 (materiel) and 12 (personnel) each opening at one end thereof into the chamber and at the other end thereof into an auxiliary building B and dye becks 13 and 14 within the chamber. Platform P provides a working and storage area.

Safety apparatus A for abruptly cooling the contents of the dye becks 13 and 14 is also contained by the chamber 10, and comprises reservoirs 15 and 16 (one for each dye beck) containing cooling fluid, e.g., water, conduits 17 and 18 connecting said reservoirs to dye becks 13 and 14, respectively, and safety valves 19 and 20, respectively, disposed in conduits 17 and 18. Safety valves 19 and 20 retain the cooling fluid in the reservoirs and are adapted to open fully when actuated to quickly discharge the cooling fluid into the dye becks.

Liquid supply pipes 21 are connected to the dye becks and extend through the chamber walls to an outside source of liquid for providing the dye becks with dyebaths. Discharge pipes 22 connect the dye becks 13 and 14 to a sump S within the chamber and discharge pipe 23 connects the sump S with an external sewer. Valves V in the supply pipes 21 and the discharge pipes 22 control the filling and draining of the dye becks. The valve V in discharge pipe 23 is controlled by the liquid level in the sump S, opening when said liquid level becomes high and closing when the liquid level becomes low.

The materiel lock 11 as shown in detail in FIGS. 3 and 4 has tubular walls 25 and a bulkhead 26 hermetically sealed to said walls at each end of the lock. Each bulkhead is buttressed on the low-pressure side with knees 27 which are welded to the bulkhead and said walls. An eccentric opening 28 in each bulkhead provides access to the lock 11 from each end. Sealing rings 29, each having an annular groove 30, encircle each opening 28 and are secured on the high-pressure side of each bulkhead 26. Sealing rings 29 are adapted to receive doors which will be described more fully hereinafter to provide in co-operation with said doors, an air-tight closure at each end of the lock 11.

The lock 11 is sealed to the chamber 10 at one end and connected to the auxiliary building B at the other end. At the chamber-end, a circular overhead door 31 having a peripheral flange 32 on its low-pressure side is adapted to engage the sealing ring 29 such that the flange 32 fits into the annular groove 30 of said ring to seal the chamber-end of the lock 11. A right angle ring 33 is welded at its outer planar surface to the high-pressure side of door 31 and at its arced surface to the tubular walls. A circular plate 34 having a peripheral flange 35 covers the right angle ring 33 with the flange 35 fitting into said ring to engage the inner planar surface thereof as shown.

A rectangular, channel-beam frame 36 is constructed with its horizontal sides longer than its vertical sides such that said horizontal sides extend beyond both sides of the lock 11. The rectangular frame is constructed with two rigid arms 37, one above the other at the approximate center of said frame, respectively, on the upper side and lower side thereof. Each arm 37 is pivotally connected to one end of a link 38, the other end of which is pivotally connected to the door 31, suitable openings being provided in the circular plate 34 to permit the passage of said arms therethrough. V-groove wheels 39 are rotatably mounted at each corner of the rectangular frame 36.

Within the pressure chamber 10 there are constructed two lower V-tracks 40, one on each side of the lock 11, and two pair of upper V-tracks 41, one pair on each side of said lock. All of said V-tracks are substantially parallel to each other and steeply slant upwardly away from the door 31. The lower V-tracks 40 are inverted and so positioned to engage the V-groove of the lower wheels 39. Each pair of upper V-tracks 41 comprises a top track 41a and a bottom track 41b so disposed that the arms of the V-tracks 41a and 41b converge on a common plane. The V-groove of each upper wheel 39 engages both the top track 41a and the bottom track 41b of one pair of upper V-tracks.

A counterweight cable 42 is attached to each upper corner of the rectangular frame 36 and passes over a series of pulleys to a counterweight 43. A pneumatic cylinder (not shown) mounted on the frame 36 and acting on circular plate 34 when actuated, forces the door into tight engagement with the sealing ring 29 to seal the chamber-end of lock 11.

The door 31, as shown, is in closed position. In order to open door 31, the pressure of the pneumatic cylinder is released to free said door from the sealing ring 29. The door 31 is then lifted with the aid of counterweights 43. The lower wheels 39 are guided by lower V-tracks 40 and the upper wheels 39 are guided by the upper V-tracks 41, thus guiding the door 31 to its overhead position.

The auxiliary building-end of materiel lock 11 has a circular door 45 mounted on hinges 46 which are mounted on the high-pressure side of bulkhead 26. The circular door 45 is constructed with a peripheral flange 47 which, when the door is closed, fits tightly into the annular groove 30 of sealing ring 29. A pneumatic cylinder 48, pivotally mounted at one end on the walls 25 of the lock and connected at the other end through suitable linkages to the circular door 45, provides the necessary driving force for opening and closing said door. It is to be noted that the eccentric location of the openings 28 in the bulkhead 26 permits full opening of door 45.

The materiel lock 11 contains a pair of parallel V-rails 50 and a cart 51. The V-rails 50 are mounted on crossties 52 in the lower portions of said lock. The rails 50 extend from the eccentric opening 28 on the auxiliary building-end of the lock to the eccentric opening 28 at the opposite end.

The cart 51 is comprised of a rectangular chassis 53, V-groove wheels 54 rotatably mounted at each corner of said chassis and three parallel channel tracks 55 mounted on top of the chassis 53. The V-groove wheels 54 engage and ride on the V-rails 50 as the cart 51 is pushed from one end of the lock 11 to the other. The channel tracks 55 project beyond the chassis 53 on the chamber-end thereof so as to evenly meet the platform P of the chamber 10 when the cart 51 is at the chamber-end of the lock 11. The channel tracks 55 are of such size and so positioned as to receive and guide the wheels of a conventional hand-truck T.

Also mounted on the chassis 53 are two stop devices 56 to prevent the truck T from rolling when moving the cart 51. The stop devices 56 each comprise a stop arm 57 rigidly mounted on a rod 58 which is rotatably mounted on the chassis 51, and a handle 59 at each end thereof for turning said rod. The stop arm 57 of one stop device is adapted to engage one side of the center wheel axle of the truck T upon rotation of its rod 58 and the stop arm of the other stop device is adapted to engage the other side of said center wheel axle upon rotation of its rod 58, thereby preventing relative movement of said truck on cart 51.

The personnel air lock 12, as shown in detail by FIGS. 5, 6 and 7, comprises a tubular wall 60, circular bulkheads 61, doors 62 and reinforcing members 63a, 63b and 63c. The tubular wall 60 is sealed at one end to the chamber 10 and is connected to an auxiliary building at the other end. The bulkheads 61 each have ellipse-like openings 64 for permitting passage of personnel into and out of the lock 12. The doors 62 are mounted on hinges 65 which are mounted on the pressure side of the bulkheads 61 alongside each opening 64 to provide closures therefor. Peripheral seals 66 of elastomeric material are attached to the doors, as shown, to provide air-tight closures when the doors are shut. Suitable handles, locking devices and pneumatic opening and closing devices (not shown) are also mounted on the doors to provide ease in opening, closing and securing said doors.

Reinforcing members 63a are right-angle steel rings which are welded to the tubular wall 60 and to the bulkheads 61 on the low-pressure side thereof. Reinforcing members 63b are upright I-beams welded at their ends to the top and bottom of tubular wall 60 and are welded at the high-pressure side thereof to bulkheads 61. Reinforcing members 63c are right-angle steel arcs, the planar surfaces of which are welded to the low-pressure side of the I-beams 63b and arced surfaces of which are welded to the tubular wall 60.

Seats 67 for the comfort of personnel in the air lock 12 and a platform P are suitably provided. Sight-glasses 68 through the bulkheads 61 are also provided.

A sample lock 70 for passing samples of textiles and dyebath to the auxiliary building B for analysis is mounted in a hole through the low-pressure bulkhead 61. The sample lock 70, shown in detail in FIG. 8, comprises a cylindrical casing 71 and an end partition 72 at each end of said casing. Each partition 72 has an eccentric, circular port 73 and mounts a grooved sealing ring 74 encircling said port. A circular port-door 75 having a peripheral flange 76 is mounted by hinges 77 on the high-pressure side of each partition 72 such that said port-door swings clear of direct passage through the ports 73. The peripheral flanges 76 of port-doors 75 are adapted to fit into and tightly engage the grooved sealing rings 74 to provide air-tight closures when said port-doors are shut. An adjusting screw and nut assembly 78 is mounted on each port-door 75, as shown, and bears on the hinge 77 to ensure proper alignment of flange 76 of said port-door with the grooved sealing ring 74.

Pressurizing apparatus for building up pressure in the pressure chamber 10 and controlling the pressure in the air locks 11 and 12 is diagrammatically illustrated in FIG. 9. The pressurizing apparatus comprises a compressor 80, an outlet pipe 81 connecting the compressed air output of said compressor to the pressure chamber 10, and an inlet pipe 82 connecting the air intake of said compressor to the air lock 11 or 12 and the atmosphere through check valve 83. Valve 84 governs the flow of air from the air lock 11 or 12 to the compressor 80. Connecting pipe 85 communicates air lock 11 or 12 directly with pressure chamber 10 and air flow in said connecting pipe is controlled by valve 86. Valve 87, when open, connects the air lock 11 or 12 to the atmosphere.

In going into the chamber 10, personnel and/or materiel are moved into the air lock 11 or 12, both doors are sealed and valves 84 and 87 are closed. Valve 86 is then opened to permit the interior pressure of said air locks to equalize with the pressure existing within said chamber. When the pressures are equalized, the inner door to chamber 10 is opened and personnel and materiel are moved into said chamber. Pressure gauges 88 and 89 indicate the pressures, respectively, in chamber 10 and air lock 11 or 12. Equalization of pressures in chamber 10 and in air lock 11 or 12 is also indicated when there is no movement of air through connecting pipe 85 with valve 86 wide open. Check valve 83 admits air to compressor 80 while valve 84 is closed.

In going out of pressure chamber 10, the inner door of the air lock 11 or 12 leading to said chamber is opened (the outer door to the atmosphere remaining closed), personnel and/or materiel are moved into said air lock and the inner door is sealed. Valve 86 is closed (valve 87 remains closed) and valve 84 is opened. Compressor 80, when operating, removes air from the air lock 11 or 12 until the pressure within said air lock equals the prevailing atmospheric pressure, at which time check valve 83 opens to supply air from the atmosphere to said compressor. When compressor 80 is not operating, the pressure inside the air lock 11 or 12 is equalized with atmospheric pressure by opening valve 87. Pressure gauge 90 indicates the prevailing atmospheric pressure and, when compared with readings from gauge 89, provides an indication of pressure equalization. Cessation of air flow into pipe 82 with valve 84 and/or valve 87 open also indicates pressure equalization.

A safety apparatus A, as shown diagrammatically in FIG. 10, is provided for each dye beck 13 or 14 in the pressure chamber 10. Each safety apparatus A, described in detail with regard to dye beck 13, comprises in addition to the cooling fluid reservoir 15, the conduit 17 from the reservoir to the dye beck 13, the safety valve 19 interposed in said conduit to prevent downward flow of cooling fluid, a dyebath temperature-sensing device 91, pressure-sensing device 92 for sensing the pressure acting on the dyebath, a control mechanism 93 for comparing the sensed temperature and the sensed pressure and actuating a valve opening device 94 when the sensed pressure drops to a predetermined value at which the boiling point of the dyebath is just above or below the sensed temperature.

As shown in FIG. 11, the reservoir 15 is supported in the upper portions of pressure chamber 10 by I-beams 95 to which said reservoir is secured by straps 96. In order to permit a higher rate of flow of cooling fluid to the dye beck 13, two or more conduits 17 connect the reservoir 15 to said dye beck.

FIG. 12 illustrates in detail the valve 19 and the valve opening device 94. Valve 19 simply comprises a frangible disc 97, for example, glass, interposed across conduit 17 and held fluid-tight in place by flanges 98 and rubber gaskets 99. The valve opening device 94 comprises two or more blasting caps 100 suspended in conduit 17 below disc 97 by brackets 101 mounted, through a hole provided in said conduit, on access door 102 bolted to said conduit. Energizing wires 103 are connected to the blasting caps 100 and extend out of conduit 17 through nipple 104, extending through access door 102, to the control mechanism 93. The nipple 104 is packed with a potting compound 105, and a gasket is disposed between access door 102 and conduit 17 to provide a water-tight seal.

When the blasting caps 100 are energized, they explode to rupture the frangible disc 97, thereby releasing the cooling fluid contained by reservoir 15.

The control mechanism 93, shown in detail in FIG. 13, comprises a control circuit having a relay coil C, a pressure-operated rheostat R and temperature-sensing device, e.g. a thermistor 91, connected in series to a constant direct current source D.C. The coil C when adequately energized moves in armature (not shown) which closes a power circuit to the blasting caps 100 to set them off. The initial resistance of the rheostat R and thermistor 91 are set at sufficiently higth values that no current, or current insufficient to adequately energize coil C, flows through said coil. The rheostat R is actuated by the pressure-sensing device 92 to decrease resistance when the sensed pressure decreases and resistance is decreased when the sensed temperature increases. The resistance change of the thermistor 91 per unit change in sensed temperature and the resistance change of the rheostat R per unit change in sensed pressure, in addition to the voltage derived from the constant direct current source D.C. and the current required for energizing relay coil C to activate its armature, are of such values that when the sensed temperature approximates the dyebath boiling point at the sensed pressure, the current flowing through relay coil C is at least that required to activate the armature. Preferably, the resistance of the control circuit is reduced somewhat below the above-described value, or the voltage of the direct current source is increased somewhat over the above-described value, to permit activating current to flow when the sensed temperature is a predetermined amount, for example, 5° F., below the dyebath boiling point at the sensed pressure. In this manner, a margin of safety is provided in that the cooling fluid will be released to the dyebath a few degrees before the sensed temperature reaches the dyebath boiling point at the sensed pressure. The spontaneous evaporation of dyebath liquor prior to the arrival of the cooling fluid in the dyebath is thus avoided.

Figure 14:
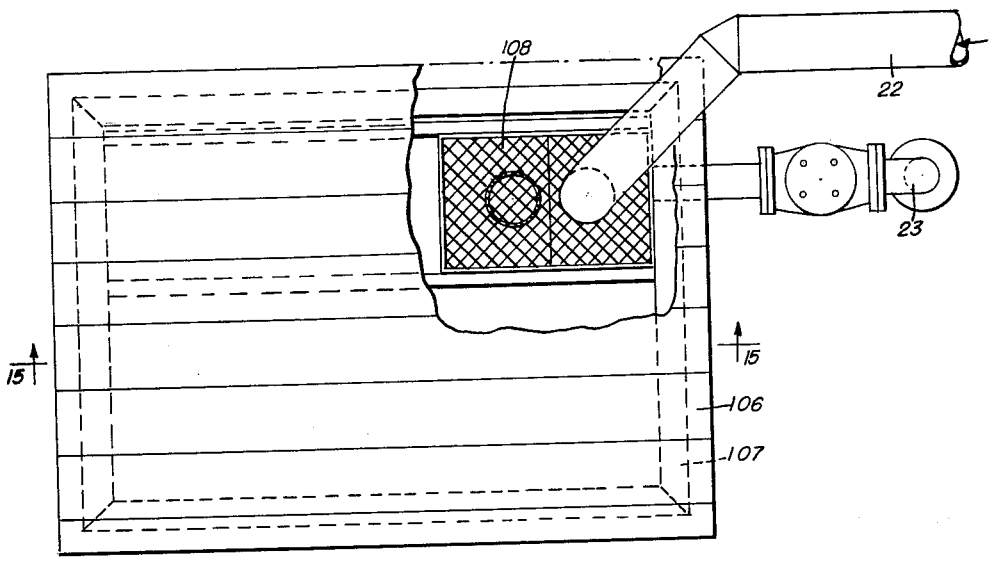
FIG. 14 is a plan view of a sump for discharging spent dyebath from the pressure chamber, a part of the cover on said sump being cut away.
Figure 15:
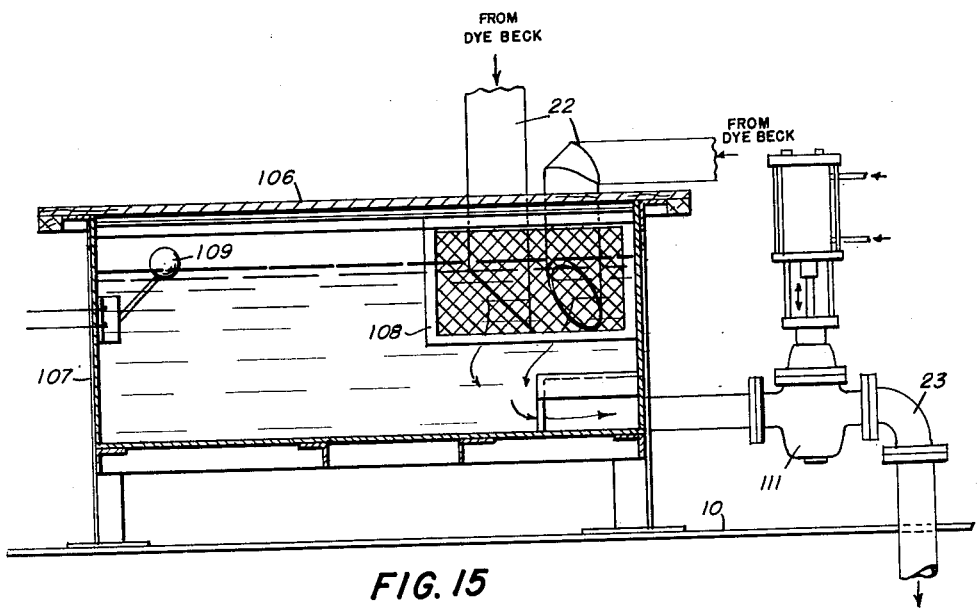
FIG. 15 is a sectional view on line 15—15 in FIG. 14.

The sump S, shown in detail in FIGS. 14 and 15, comprises a vessel 106, a cover for the vessel 107, a strainer 108 through which liquids entering the sump pass, a liquid-level float device 109 and a shielded outlet 110. Connected to said outlet is a discharge pipe 23 leading out of the pressure chamber 10 to an external sewer. A valve 111 is interposed in the discharge pipe 23 to control the liquid level in sump S. Initially the dye beck is drained into the sump S, raising the liquid level therein until it reaches a predetermined high level whereupon the float device 109 energizes the valve 111 to discharge the sump contents through pipe 23 to the sewer. When the liquid level drops to a predetermined low level, the float device 109 actuates the valve 111 to close it and thus stop the discharge of the sump contents.

Figure 16:
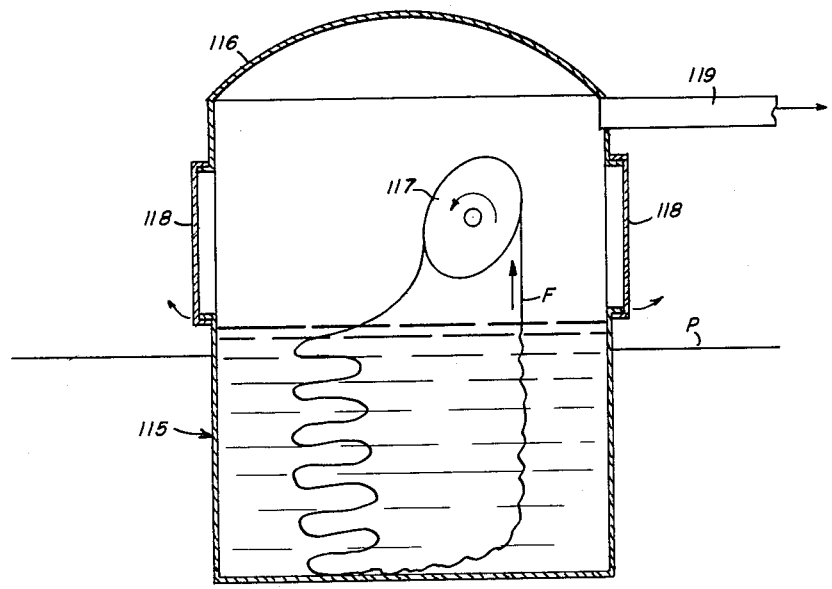
FIG. 16 is a diagrammatic cross-section of a dye beck which can be employed in the textile treating system.

FIG. 16 illustrates a conventional dye beck as a specific type of dyeing equipment that can be employed in the textile treating system. In general, the dye beck comprises a vessel 115 containing a dyebath, a hood 116 covering said vessel, and an elliptical, drive roll 117 for moving the textile F being dyed through the dyebath. The hood 116 is constructed with doors 118, which need not be gas-tight, for permitting access to the dyebath and textile F and a vent 119 for venting air-vapor mixtures formed over the dyebath. The dye beck is so positioned with relation to the platform P of the pressure chamber as to permit easy access to the interior of the dye beck by operators working from said platform.

In operating the dye beck, the vessel 115 is filled with the dyebath and the textile F is disposed around the elliptical, drive roll 117 in a continuous loop and into the vessel 115, as shown. The dyebath is heated by injecting steam into it and the drive roll 117 is turned to move the textile F through the dyebath. Doors 118 are shut to prevent the escape of undue amounts of dyebath-vapors into the personnel working areas. The dyebath-vapors escape through vent 119 along with air and are separated from the air by conditioning equipment to render the air comfortable for human consumption.

Figure 17:
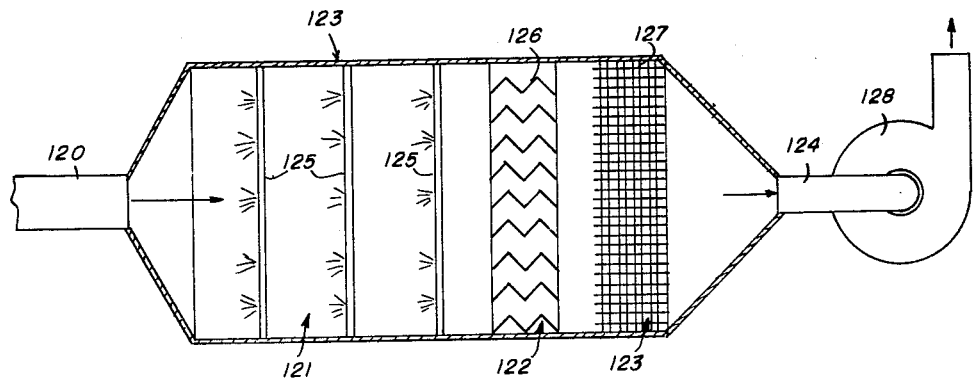
FIG. 17 is a diagrammatic view in longitudinal section illustrating equipment for conditioning the air-vapor mixture formed over the dyebath.

Suitable conditioning equipment, as illustrated in FIG. 17, can be conventional and generally comprises an inlet 120, a water-spray compartment 121, an eliminator compartment 122, a heating compartment 123 and an outlet 124. The water-spray compartment 121 contains banks of water-sprayers 125. The temperature of the water being sprayed by each bank 125 is lower than the temperature of water being sprayed by the next previous bank, if any, so that as air enters through inlet 120 and travels through the water-spray compartment 121 it is cooled, in addition to being washed. The eliminator compartment 122 contains spaced eliminator plates 126 which remove entrained water from the cool, washed air exiting from the water-spray chamber 121. The heating compartment 123 contains heating coils 127 through which steam or other heating fluid passes to heat the air traveling over said coils. A fan 128 at the outlet 124 draws air through the conditioning equipment at a suitable rate. The temperatures of water being sprayed from the respective banks 125 and the temperature of the heating compartment 123 are selected to provide exiting air having a comfortable temperature and humidity. Illustratively, assuming saturated air entering the inlet 120 from the dye beck vent 119 has a temperature of 230° F., the water-spray compartment 121 washes the air and cools it to about 55° F. by spraying water at the respective temperatures of 80° F. for the first bank 125, 60° F. for the second bank 125 and 50° F. for the third bank. The air as it enters the heating compartment 123 has a relative humidity of 100% and after heating to about 75° F. in said heating compartment, the relative humidity drops to about 50%. Air, thus conditioned to comfortable characteristics, is then forced by fan 128 back into the working areas of the pressure chamber.

In operation, the pressure chamber 10 is sealed by closing the inner doors of air locks 11 and 12 and the pressure is built up by the compressor 80. The pressure level is generally governed by the temperature at which it is desired to carry out dyeing. The dyebath can be wholly prepared in the pressure chamber 10 using water pumped in through supply pipe 21 or it can be prepared outside of said chamber and brought in, for example, via pipe 21.

Temperatures above the atmospheric boiling point of the dyebath, but below its boiling point at the pressure acting directly on it, are necessary for providing all of the advantages of pressure dyeing. Temperatures in the range approximately from 230° F. to 250° F. are adequate. Higher or lower temperatures can be used, if desired. Higher temperatures do not appear to provide improvements commensurate with the increased cost and other inconveniences accompanying the use of such higher temperatures. Temperatures lower than 230° F. also can be used, if desired, although best results may not be obtained thereby.

The chamber pressure is maintained at a high enough level to permit dyeing at the desired dyebath temperature without boiling. In order to prevent undue boiling of the dyebath, the chamber pressure preferably is of such magnitude that the pressure acting directly on the dyebath provides a dyebath boiling point which is a few degrees above the dyebath temperature being employed. In this regard, it is to be noted that, if the dyebath is covered with a hood or other enclosure the pressure acting on the dyebath during operation is usually somewhat higher than the chamber pressure. Illustratively, pressures up to 25 p.s.i.g. are advantageously employed. Higher pressures can be employed, if desired, although no commensurate improvements over the outstanding results obtained at lower pressures appear to accrue therefrom. Pressures in the approximate range of 6 p.s.i.g. to 15 p.s.i.g. are adequate.

When a safety apparatus, such as, safety apparatus A, is employed, the dyebath temperature is maintained at a value below the safety margin imposed on said safety apparatus so as to prevent unintentional actuation of said apparatus and consequent cooling of the dyebath before the dyeing operation has been completed.

Dyeing is carried out in the usual manner at non-boiling, elevated temperatures above the atmospheric boiling point of the dyebath while operators have ready access to the dyebath and textiles being dyed to remove samples for analysis and to make adjustments thereto. After dyeing, the dyed textile is removed from the dye beck and exited through the material air lock 11 and the spent dyebath is drained through pipes 22 to the sump S whence it is discharged through pipe 23 to the sewer.

Dyeing in accordance with this invention greatly reduces dyeing time and exhaustion of the dyebath is substantially complete, thus enabling the use of smaller amounts of dyes. Since the dyebath employed need not be maintained at a boil, the violent action accompanying ebullience and the consequent tangling of the textile being dyed are avoided. The absence of violent action is especially desirable when dyeing yarns in skeins or hanks. The use of expensive dyeing assistants or carriers, heretofore particularly employed when dyeing synthetic fibers, is reduced or eliminated as not being necessary.

A deeper fiber penetration by the dye is obtained in accordance with this invention resulting in dyed textiles of greatly improved fastness and permitting synthetic textiles to be dyed in deep shades. Cross-dyeing without staining of non-dyeable substrates also is readily performed. Other advantages including economies on steam and compressing energy are realized by practicing the invention described herein.

The system described herein is not limited to dyeing but is useful in any treatment of textiles wherein superatmospheric pressure and high temperatures are of importance. The system is especially applicable to dyeing synthetic fibers, such as, Dacron, Orlon and nylon, since the rate of dye absorption on these fibers is so extraordinarily low at conventional dyeing temperatures and pressures, employing conventional dyeing techniques, that only light, pastel shades are usually obtained. Nevertheless, the use of the system described herein for dyeing cotton and other textiles decreases the dyeing time and increases dyeing efficiency.

What is claimed is:

1. In a process for dyeing textile material in a dye bath positioned in a dye room which is of sufficient size to permit personnel to move freely therein while carrying out said dyeing operation, the improvement which comprises sealing said dye room and building up an air pressure therein in excess of atmospheric pressure outside said room; thereafter dyeing said material in said dye bath while maintaining the pressure over the dye bath substantially the same as the pressure in said room and while maintaining the dye bath at a temperature in excess of its boiling point at atmospheric pressure but below the boiling point thereof at the pressure in said room; maintaining the pressure in said room substantially constant throughout dyeing operation, providing a personnel admitting and discharging zone between said dye room and the outside atmosphere, raising the pressure in said zone to above atmospheric pressure and equalizing the pressure in said zone and said dye room by opening a valve in a pipe connecting said dye room and said zone to admit personnel into said dye room and reducing the pressure in said zone from the pressure in said room to atmospheric pressure to discharge personnel from said dye room during the dyeing operation without varying the pressure in said room.

2. In a process for dyeing textile material in a dye bath positioned in a dye room which is of sufficient size to permit personnel to move freely therein while carrying out said dyeing operation, the improvement which comprises sealing said dye room and building up an air pressure therein in excess of atmospheric pressure outside said room; thereafter dyeing said material in said dye bath while maintaining the pressure over the dye bath substantially the same as the pressure in said room and while maintaining the dye bath at a temperature in excess of its boiling point at atmospheric pressure but below the boiling point thereof at the pressure in said room; maintaining a superatmospheric pressure in said room throughout said dyeing operation, providing a personnel admitting and discharging zone between said dye room and the outside atmosphere, raising the pressure in said zone to above atmospheric pressure and equalizing the pressure inside the zone and said dye room to permit the admission of personnel into said dye room, and reducing the pressure in said zone from the pressure in said room to atmospheric pressure to permit the discharge of personnel from said dye room during the dyeing operation without substantially varying the pressure in said dye room.

3. The process as defined in claim 2 together with the step of conditioning the pressurized air within said dye room for human breathing and recirculating said air in said dye room.

4. The process as defined in claim 2 together with the step of maintaining a supply of cooling water in said dye room and cooling said dye bath with said water in the event of pressure failure in said dye room.

References Cited by the Examiner

UNITED STATES PATENTS

| | | | |
|---|---|---|---|
| 1,025,323 | 5/12 | Smith | 8—158 |
| 1,387,072 | 8/21 | Putnam | 68—5 |
| 1,400,675 | 12/21 | Grundy | 8—158 |
| 1,602,026 | 10/26 | Juergens | 68—5 |
| 2,244,082 | 6/45 | Reyniers. | |
| 2,387,200 | 10/45 | Walter. | |
| 2,904,981 | 9/59 | Macomson | 8—159 XR |

OTHER REFERENCES

Instrumentation, pages 4–7 and 34, vol. 5, No. 6, April 11, 1952.

Heiser: Instrumentation, pages 4–8, vol. 6, No. 4, 1953.

Flight, Sept. 29, 1949, pages 417–420.

Plane Tips, The Glenn L. Martin Co. Eng. Educational Program, Sept. 11, 1945, vol. 13, No. 47, 2 sheets drwg.

NORMAN G. TORCHIN, *Primary Examiner.*

WILLIAM B. KNIGHT, MORRIS O. WOLK,
*Examiners.*